July 28, 1959

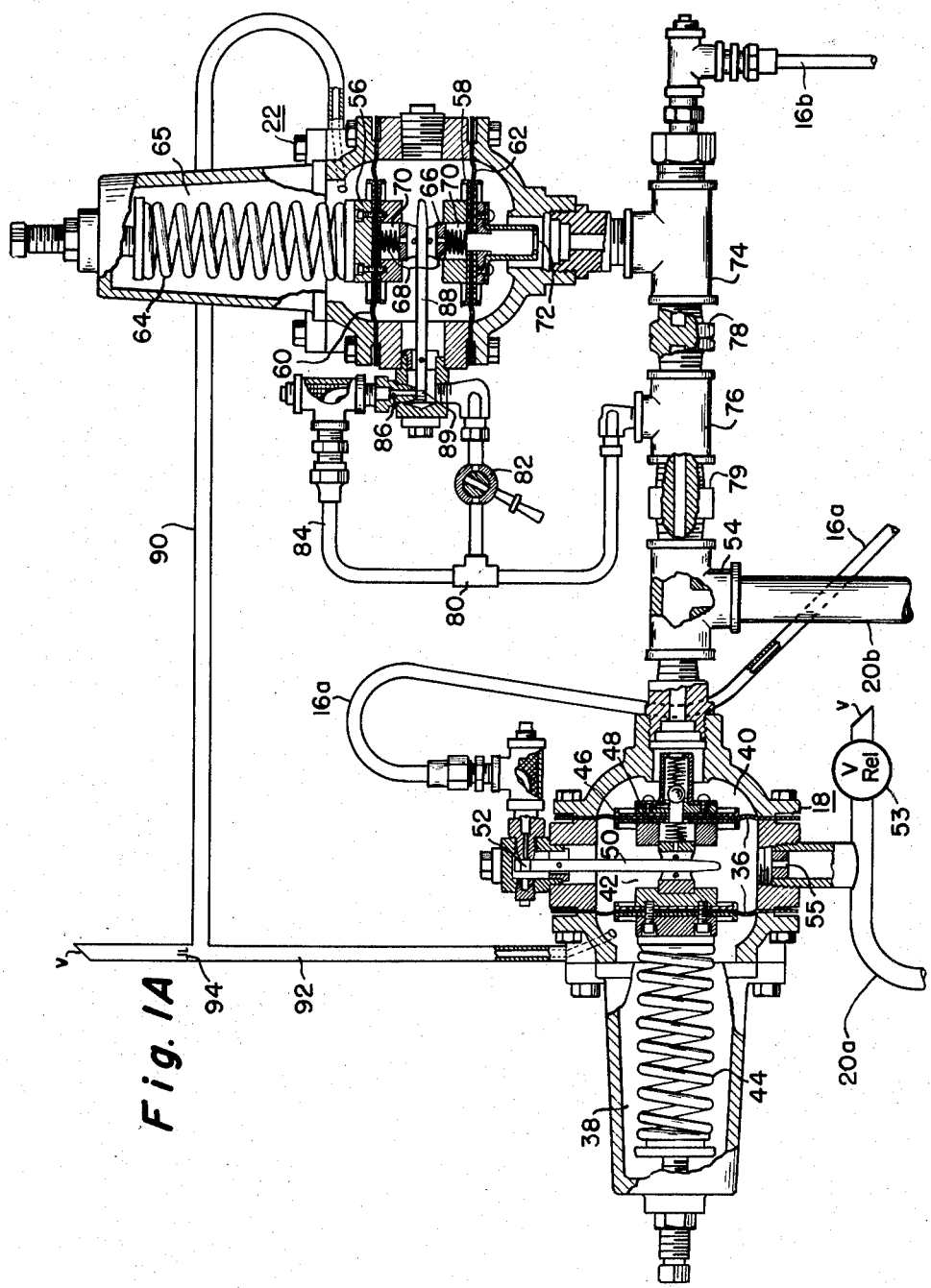
Fig. IA

R. P. LOFINK 2,896,660

AUTOMATIC PRESSURE REGULATING VALVE

Filed May 2, 1956

INVENTOR.
Raymond P. Lofink
BY Webb, Mackey & Burden
HIS ATTORNEYS

United States Patent Office 2,896,660
Patented July 28, 1959

2,896,660
AUTOMATIC PRESSURE REGULATING VALVE

Raymond P. Lofink, Neville Island, Pa., assignor to The Chaplin-Fulton Manufacturing Company, Pittsburgh, Pa., a corporation of Pennsylvania Application May 2, 1956, Serial No. 582,098

10 Claims. (Cl. 137—456)

The present invention relates to constant pressure regulating valves embodying a main valve and a pilot valve controlling the main valve. It particularly relates to a valve of this type having means whereby the main valve is closed in event of a leak in an outlet line from the main valve or in pilot lines connecting the main and pilot valves.

It is conventional practice in gas pressure regulation work to interconnect the main valve with a pilot valve which automatically adjusts the main valve by shifting it toward or into its closed position whenever the main valve outlet pressure increases, and which acts to shift the main valve toward or into its fully open position whenever the main valve outlet pressure decreases. Such pressure regulating valves have a serious defect in that if there is a leak or break in the outlet line or in the pilot lines the main valve is kept in wide open position due to the drop in pressure in these lines.

I have invented a pressure regulating valve which does not have this defect. My valve includes a pressure actuated shut-off valve connected into a pilot line interconnecting a main valve and a pilot valve, such shut-off valve operating in conjunction with the pilot valve to shut the main valve automatically whenever a leak or break of the above character occurs. The shut-off valve automatically closes, causing the pilot valve to close which in turn closes the main valve, all in response to main valve outlet pressure whenever it becomes too low. Cutoff valves which close a valve upon failure of a gas supply are, of course, known. Such valves which have heretofore been proposed, however, close the valve only when the pressure of the gas supply drops to zero. In my valve, the valve is closed whenever the pressure in the supply line drops below a predetermined value.

I show one preferred embodiment of my invention in the accompanying drawings, in which:

Figure 1A and 1B are companion halves showing the same valve system;

Figure 1B:
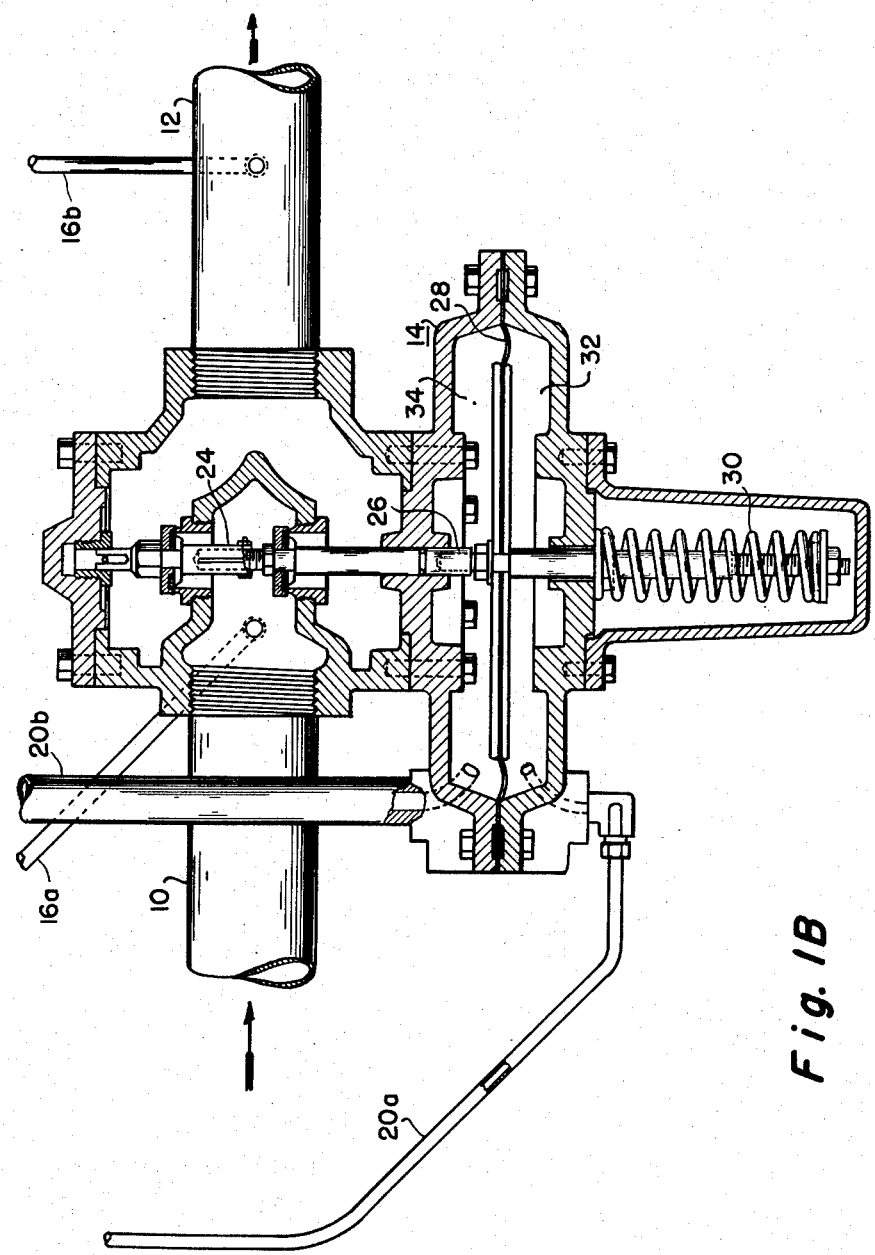

In particular, the drawings show an automatic shut-off valve arrangement of which the principal components comprise an inlet 10, an outlet 12, a main regulator valve 14 connecting the inlet and the outlet, two pilot lines 16a and 16b connecting the inlet and outlet in parallel with the regulator valve 14, a pilot valve 18 included between the pilot lines 16a and 16b and having a second set of connections 20a and 20b to the regulator valve 14, and a shut-off valve 22 included in the pilot lines 16a and 16b in a manner whereby the valves 18 and 22 are connected in series. The outlet 12 receives gas under regulated pressure from the regulator valve 14.

The regulator valve 14 is conventional, having a double valve 24 mounted on a valve stem 26 actuated by a diaphragm 28 and a spring 30. The diaphragm 28 divides the interior of the valve 14 into a loading chamber 32 and an opposing chamber 34 which when pressurized assists the spring 30.

The pilot valve 18 has a pair of diaphragms 36 which divide the interior thereof into a spring containing compartment 38 at one end, a control chamber 40 at the opposite end, and a centrally disposed loading chamber 42. A spring 44 which occupies the spring compartment 38 engages a diaphragm clamping structure 46 which is jointly carried by the diaphragms 36 and which has a restricted passage 48 forming a permanently open bleed openng between the chambers 40 and 42. The spring 44 and the diaphragm 36 cooperate in acting through the structure 46 to control an end of a pivoted lever 50 which carries a valve 52 at its other end. The valve 52 controls the pilot line connection 16a leading from the inlet 10. The connection 20a has a side vent to atmosphere at v which includes a spring loaded relief valve 53 that is pre-set to stay closed at or below a desired minimum pressure.

The connection 20a has a fixed restriction 55 at its point of connection with the valve 18 and interconnects and maintains the loading chambers 42 and 32 at equal pressure within the respective valves 18 and 14. The other chambers 40 and 34 in these same valves are maintained at equal pressure with one another by reason of communicating through a T fitting 54 and the connection 20b. The T fitting 54 is normally pressurized at substantially outlet pressure through the shut-off valve 22 and the pilot line connection 16b.

As in the case of conventional pressure regulators, the pilot valve 18 actuates the main regulator valve 14 to shift the double valve 24 thereof toward its closed position whenever the pressure in the main valve outlet 12 increases, and conversely to shift the double valve 24 toward or into its fully open position whenever the main valve outlet pressure decreases. This action is independent of the volume of flow.

The shut-off valve 22 has an upper bipartite diaphragm clamp 56 and a lower bipartite diaphragm clamp 58, holding a control diaphragm 60 and a guiding diaphragm 62 respectively. A helical closing spring 64 which occupies a spring compartment 65 presses against the diaphragm clamp 56 and a portion of the case of the valve 22. The upper and lower clamps 56, 58 have an elastic interconnection including a sliding yoke 66 and a pair of opposite coil springs 68 which cause the yoke to float as it is guided in opposite directions in a set of confronting chambers 70 formed in the clamps 56 and 58. The diaphragms 60 and 62 mutually define a chamber therebetween which is connected to the outlet 12 through an opening 72, thence through a T fitting 74, and one of the pilot lines 16b. The T fitting 74 is physically connected to another T fitting 76 by means of a blind nipple 78 to mount the valve 22 adjacent the valve 18. The T 76 is connected to the T 54 through an open nipple 79 and to the chamber between the diaphragms 60 and 62 by means of a T fitting 80 and a manually controlled shut-off valve 82. The T fitting 80 has a further connection 84 to a valve-controlled passage 86 leading directly into the shut-off valve 22.

The yoke 66 has a pair of pins which straddle and receive one end of a pivoted lever 88 which carries a valve element 89 at its other end for controlling the passage 86.

The shut-off valve 22 has a vent pipe 90 which joins a pilot valve vent pipe 92 and together they vent the respective spring compartments 65, 38 to atmosphere at v through a common restriction 94. In their idle depressurized state the valves 14, 18, and 22 are in the following positions. The main valve 14 is closed, since there is no difference in pressure on opposite sides of the control diaphragm 28 with the result that the unopposed coil spring 30 holds the double valve element 24 firmly seated. The pilot valve 18 is open, since there is no difference in gas pressure between the chambers 40, 42 and the chamber 38 with the result that the coil spring 44 in the latter chamber holds the valve element 52 off its seat. The shut-off valve 22 is closed, since there is no difference in pressure on opposite sides of the control diaphragm 60 with the result that the coil spring 64 holds the valve element 89 firmly against its seat. Let it be assumed that at this point the manually controlled valve 82 is also closed.

In the idle, pressurized state in which the inlet 10 is pressurized at line pressure, the valves 14, 18 and 22 are in the following positions. The shut-off valve 22 is closed as formerly and the regulator valve 14 is closed as formerly. The pilot valve 18, however, shifts from open position towards the closed position as will now be explained. Line pressure passes from the inlet 10 through the pilot line 16a past the initially open valve element 52 into the loading chamber 42 in the pilot valve 18, through the restricted passage 48, the control chamber 40, the fitting 54 and the connection 20b, the chamber 34 above the diaphragm 28. The rising pressure in the chamber 40 acts against the adjacent one of the diaphragms 36 to force the diaphragm clamp structure 46 to shift to the left (viewing Figure 1A) to a position at which the coil opening spring 44 establishes a balanced relationship of thrust with the gas force exerted on the diaphragm 36. At this point the valve element 52 in the pilot valve 18 assumes an adjusted regulating position tending to maintain the pressure in the loading chambers 42 and 32 at a value depending upon the pretensioning adjustment of the spring 44.

It is to be noted that the pilot line connections 16a, 16b form a first path which includes the noted loading chamber 42, the restricted bleed opening 48 and the T fitting 54 and which, through the shut-off valve 22 is connected in parallel with the regulator valve 14 between the inlet and outlet 10, 12.

It is to be further noted that the connections 20a and 20b between the two valves 14 and 18 establish a second path interconnecting the opposite sides of the diaphragm 28 in the valve 14, such path including the loading chamber 42, the restricted bleed opening 48, and the T fitting 54.

The valves 14, 18, and 22 are set into operative pressurized state in two steps involving the manually controlled valve 82 as follows.

The manually controlled valve 82 is opened and left open for a short period for the purpose of priming the system. Immediately the pressure in the T fitting 54 drops owing to a free path for the escape of gas leading to the outlet 12 through the T fitting 76, the open valve 82, the interior of the shut-off valve 22, the T fitting 74, and the pilot line 16b. The drop of pressure within the T fitting 54 serves to vent the control chamber 40 in the pilot valve 18 and vents the compartment 34 above the diaphragm 28 in the regulator valve 14. Immediately the pilot valve element 52 is unseated due to the action of the unopposed spring 44 such that substantially line pressure is applied through the connection 20a to the loading chamber 32 in the valve 14. Simultaneously, therefore, the regulator valve 14 opens due to the unopposed line pressure in the chamber 32 and in an instant the line pressure tends to accumulate to a minor extent in the compartment 34 above the diaphragm 28 but not to a sufficient extent to act in conjunction with the spring 30 and overcome the pressure in the loading chamber 32 and cause the double valve 24 to seat. Nor does the pressure accumulate sufficiently inside the shut-off valve 22 to overcome the action of the spring 64 in holding the valve element 89 closed. Accordingly, the three valves 14, 18, and 82 are open and the valve 22 is closed under these circumstances. Line pressure from the inlet 10 is communicated substantially undiminished to the system to charge or prime the same through the double valve 24 and the outlet 12. As the system begins to charge and exert a back pressure through the pilot line connections 16b and the T fitting 74, the shut-off valve 22 is actuated and opens. The pilot valve 18 is actuated toward closed position and commences to regulate. The valve 14 is actuated toward closed position and commences regulation as follows.

The back pressure within the interior of the shut-off valve 22 moves the control diaphragm 60 and the diaphragm clamp 56 upwardly as seen in Figure 1A to open the valve element 89 and connect the fitting 80 to the interior of the valve 22.

A resulting build-up of back pressure in the control chamber 40 causes the diaphragm 36 and the diaphragm clamp structure 46 to shift to the left (as viewed in Figure 1A) and cause the valve lever 50 and valve element 52 to regulate the loading pressure at a desired value which can be established by properly adjusting the spring 44. Such loading pressure is also effective within the control chamber 32 in the regulator valve 14. Above the diaphragm 28 in the regulator valve 14, the compartment pressures varies with the back pressure and the regulator valve 14 assumes a regulating position with the double valve 24 disposed at a predetermined position off the seat. After the valves stabilize, the resulting pressure differential maintained across the diaphragm 36 causes a steady flow of gas from the loading chamber 42 through the restricted passage 48 into the control chamber 40 which is maintained at the back or control pressure approximating the regulated pressure for the outlet 12. Thereupon an operator closes the valve 82 so that gas flows from the control chamber 40 to the pilot line 16b through the valve 89. The operation is then automatic.

Let it be assumed that the outlet 12 has a drop in pressure indicative of a break in the system sufficient to call for automatic shut-off of the system. This lowers the pressure in the T fitting 74 and the interior of the shut-off valve 22 whereupon the unopposed spring 64 moves the valve lever 88 to close the valve element 89. The path of escape for gas bleeding through the restriction 48 is thereupon blocked and the pressure in the control chamber 40 builds up to the loading pressure maintained in the loading chamber 42 on the opposite side of the diaphragm 36. Increased pressure on the diaphragm 36 forces the spring 44 to the left and the valve element 52 closes off the pilot line connection 16a which conducts line pressure from the inlet 10. Pressure in the chambers 32 and 34 on the diaphragm 28 also equalize and the spring 30 closes the regulator valve 14. Thus, the inlet 10 is closed off from the outlet 12 in its main connection thereto through the valve 14, and is similarly closed off through the pilot line connections 16a, 16b which parallel the regulator valve 14.

In case the pilot line connection 16b breaks instead of the outlet 12, the same shut-off operation and sequence of closing occurs, namely, the shut-off valve 22 automatically closes causing the closing of the pilot valve 18 which causes the regulator valve 14 to close. This is an important function of my apparatus because, while we have shown the pilot line 16b as being connected to the outlet line 12 adjacent to the regulator valve 14, in practice the pilot line is connected to the point in the gas line where the pressure is to be regulated. This point may be as much as 150 or 200 feet away from the regulator valve 14. The pipe 16b is a small pipe and frequently these pilot pipes are broken during construction work.

To reset the valving and restore regulated pressure following repairs to the break in the system, the operator temporarily opens the valve 82 as described above.

In case the pilot line connection 16a breaks, the loading pressure in the loading chamber 42 will reduce substantially to zero, thus dissipating the positive pressure in the loading chamber 32 in the valve 14 whereupon the unopposed spring 30 will close the double valve 24. Similarly, in case the break occurs in the connection 20a, the double valve 24 in the regulator valve 14 will close.

The present system automatically shuts down if any valve diaphragm leaks. Specifically, a punctured diaphragm at 28 in the main valve 14 causes the pressure in the chambers 32, 34 to equalize, enabling the compressed spring 30 to extend itself, which in turn seats the double valve 24 to close the main valve. A puncture through the diaphragm 36 covering the control chamber 40 accomplishes the same as the foregoing but with one extra step, namely, by equalizing the pressure in the connections 20a, 20b so as to equalize the main valve chambers 32, 34 and thereby close the main valve 14.

A puncture at the diaphragm 60 in the shut-off valve 22 accomplishes the same equalization as the foregoing. The spring 64 shuts off the valve 22 and shuts off the system in the same way as described above.

A puncture through the diaphragm 36 covering the spring compartment 38 in the pilot valve releases gas which flows from the loading chamber 42 into the vent pipe 92 and thence through the restriction 94 to atmosphere at v. The restriction 94 builds up back pressure on the diaphragm 60 to shut off the system in the same way as described above. In case of high supply pressure, it is possible that the vent 92 will not take off the gas quick enough. The pressure in loading chamber 42 would then exceed the pressure in the control chamber 40 and the valve 14 would stay open even though the valve 22 is closed. I provide a relief valve 53 which limits the loading pressure in 20a. I also provide a stricture 55 in the line 20a between the line and the loading chamber 42. Because of this stricture, the pressure in the loading chamber 42 is higher than the pressure in the line 20a. In the event that the diaphragm 36 (nearest the spring 44) breaks the pressure in the loading chamber 42 will be higher than the pressure in the control chamber 40, but by reason of the restriction 55 the pressure in chamber 40 will be greater than the pressure in the line 20a. This pressure differential acts with the spring 30 to close the valve 14.

Figure 3:
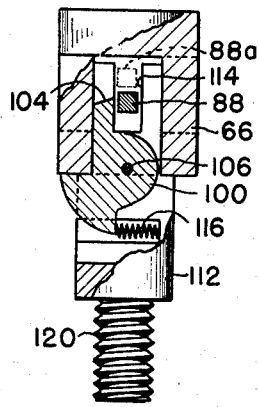
Figure 3 is a fragmentary sectional view of the modification taken along the lines III—III of Figure 2.
Figure 4:
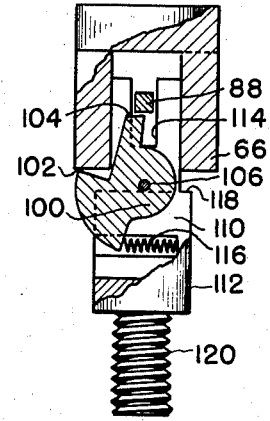
Figure 4 is a view similar to Figure 3 with the parts shifted.
Figure 2:
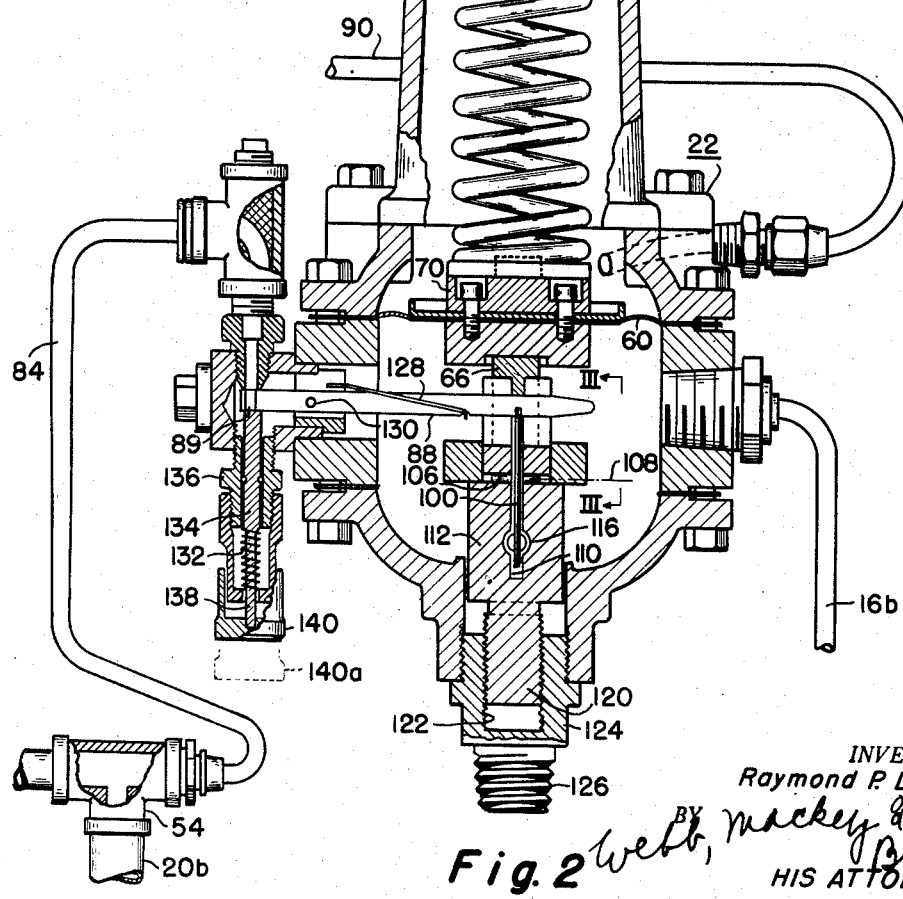
Figure 2 is a modification of one of the valves of Figure 1A.

Figures 2, 3, 4 show a modified shut-off valve 22 for a system in which two or more main regulator valves supply a common load with gas from both valves at the desired pressure. In the prior embodiment whenever gas is present under pressure in the outlet 12, Figure 1B, it can back up into the valve 22 through the pilot line connection 16b and reopen it even though the valve 22 is shut down and circumstances are such as to continue to warrant it holding the main valve 14 closed. Nevertheless, the control diaphragm 60, Figure 1A, is positively connected to the valve lever 88 and, when the diaphragm rises due to gas pressure, it causes the lever 88 to tilt the valve 89 open and thereby reopens the valves 14, 18 in the way described above.

The modification of Figure 2 has no connection between the diaphragm and the valve lever in the shut-off valve whereby raising the diaphragm raises the lever and opens the valve. However, the shut-off valve is otherwise connected into the system in the same way as the prior embodiment and operates in the same way. More specifically, the valve 22 of Figures 2-4 is directly connected to the pipes 16b, 90 and is connected to the T fitting 54 by means of the pipe 84. The valve 22 has a spring compartment 65, a spring 64 therein, a control diaphragm 60, and a pivoted valve lever 88 indirectly controlled thereby which carries a valve element 89 normally in open position. A locking plate 100 for the lever 88 is controlled solely by the depending yoke 66 through a cam connection 102 therewith, Figure 4, and which is normally cocked with its blocker 104 thereon supporting the lever 88 in a tilted position as shown in Figure 4.

The locking plate 100 has a stationary pivot pin 106 defining a fixed axis 108 about which the locking plate rocks in a first slot 110 formed in a stud 112 supporting the pivot pin. An intersecting slot 114 perpendicular to the first slot defines a path in the stud 112 for the lever 88 which it shares with the obstructing blocker 104 when the locking plate 100 is cocked. A cocking spring 116 for the plate 100 is mounted in a counterbore in the slot 110. The yoke 66 slides vertically on the sides of the upper end of the stationary stud 112 which terminates in a shoulder 118, Figure 4, forming a lower stop for the yoke 66. The stud 112 has an end portion 120 which is threaded into a socket 122 formed in the adjacent end of a plug 124 closing off the case of the valve 22. At the opposite end the plug 124 carries a mounting stud 126 adapted to be threaded into a support fitting, not shown, for the valve 22.

A light cantilever spring 128 to open the valve 22 has one end affixed to the case thereof adjacent the pivot point indicated at 130 for the lever 88 and the lever further has a stronger closing spring 132 of the coil type acting through a plunger 134 to place a heavier preload on the lever 88 tending to close the valve element 89. The spring pressed plunger 134 carries an O-ring seal with which it is sealed to a tubular outer sleeve 136 and the plunger 134 further carries a plunger stem 138 protruding through the outer end of the sleeve 136. At the protruding end the plunger stem 138 carries a pull knob 140 which can be manually pulled into the dotted line position shown by the dotted lines 140a so as to open the valve.

When the valve is open, the closing spring 132 normally presses the lever 88 to close it but is prevented from turning by the blocker 104. In this blocked position, the lever 88 will remain tilted and hold the valve 89 off its seat. The lever 88 tilts to close the valve whenever the outlet pressure on the underside of the diaphragm 60 fails to exceed the thrust of the spring 64 and hold it upwardly in its balanced position. Thus, downward movement of the diaphragm 60 as viewed in Figure 2 causes the yoke 66 to descend therewith and, against the opposition of the cocking spring 116, the yoke cams the locking plate 100 into its unlocked position whereupon the valve lever 88 under pressure from spring 132 drops from the position shown by the dotted lines 88a, Figure 3, into the solid line position 88 so as to close the valve 89.

If the outlet pressure increases and raises the diaphragm 60, it will have no effect on the lever 88 because there is no connection between the yoke 66 and the lever 88 whereby raising the yoke 66 raises the lever 88. The lever 88 can be lifted to open the valve element 89 only by pulling the plunger knob 140 into the dotted line position 140a, Figure 2. In that case, the closing spring 132 is held temporarily compressed and the lighter spring 128 now controlling the lever 88 forces the valve element 89 open. The system primes itself while the lever 88 thus remains in its upper position shown by the dotted lines 88a, Figure 3. The diaphragm 60 under outlet pressure rises carrying the clamp 70 upwardly and permitting the cocking spring 116 to rotate the locking plate 100 thereby lifting the yoke 66 and allowing the blocker 104 to move under the lever 88 to support it in tilted position with the valve element 89 locked open.

The manually pulled knob 140 can thereafter be released to leave the closing spring 132 compressed and in readiness to close the valve whenever the diaphragm 60 again trips the locking plate 100.

The shut-off valve 22 of Figure 2 has the desirable feature that it may be reset as above, but not otherwise and thus once it shuts down it will retain the main valve 14 closed in spite of what level of outlet pressure is subsequently restored to the system by other regulator means serving the same system. That is to say, restoration of the system outlet pressure by some other source than the valve 22 will be attended by gas backing up through the connection 16b from the outlet 12 thereby internally pressurizing the valve. The control diaphragm 60 and the clamp 70 thereupon separate from the locking plate 100 without opening the valve 89 for the reason that they lack a direct connection thereto.

From the foregoing, it is apparent that my improved regulating valve performs all of the functions heretofore accomplished by such valves and in addition automatically closes whenever there is a break in the valve diaphragms or outlet lines or pilot lines.

While I have disclosed a preferred embodiment of my invention, it is understood that other forms of the invention are comprehended and that I am limited only by the scope of the following claims.

I claim:

1. A fluid pressure regulator for maintaining a substantially constant pressure in a fluid supply line comprising a main valve in the supply line for controlling fluid through the line, diaphragm means for actuating the main valve, a pilot line having connections to said main line at points on the downstream and upstream sides of said main valve, which connections being each connected to a pilot valve, said pilot valve having connections to opposite sides of the diaphragm means whereby one side of the diaphragm means may be subjected to upstream fluid pressure and the other side to downstream pressure and pressures on opposite sides of the main valve may actuate said diaphragm means and the main valve, a spring connected to said valve opposing the action on the diaphragm of upstream pressure and tending to close the valve, said pilot valve having means exposed through said pilot line to pressure in the downstream side of the main valve for controlling the application of fluid pressure to the upstream connected side of said diaphragm means, means to equalize the pressure on opposite sides of said diaphragm means when the pilot line is closed between the pilot valve and the downstream side of the main valve whereby said spring closes said main valve, and a shut-off valve in the pilot line between the pilot valve and the downstream side of the main valve to close the pilot line when pressure in the pilot line drops below a predetermined value, said shut-off valve having means exposed to pressure in said downstream side to actuate said shut-off valve.

2. A fluid pressure regulator according to claim 1 and further including a spring connected to said pilot valve opposing the action of downstream pressure on the means in the pilot valve for controlling the application of pressure to the upstream connected side of said diaphragm means and tending to open the pilot valve, a compartment in said pilot valve for said spring, a pressure-retaining sealed diaphragm in the pilot valve which forms one side of the compartment receiving said spring, and an outlet connected to said spring compartment for the passage of pressure fluid therefrom incident to a fluid pressure build-up due to pressure leakage from said sealed diaphragm into said spring compartment, a fluid passage from said shut-off valve to said outlet, means in said shut-off valve exposed through said fluid passage to pressure in said spring compartment to close the shut-off valve when pressure communicated by said outlet is at or above a predetermined value.

3. A fluid pressure regulator according to claim 2 and further including a relief valve exposed so as to vent to the atmosphere said pilot valve connection to the upstream connected side of said diaphragm means, and having a stricture connected therein between the pilot valve and the relief valve, for creating an increasing drop in pressure across, and a corresponding increased resistance to flow through, said stricture with increasing flow of fluid supplied therethrough by said pilot valve.

4. A fluid pressure regulator according to claim 1, wherein said pilot line portion between said pilot valve and said downstream side of the main valve further includes a bypass valve which is connected therein with relation to the shut-off valve in said portion so that the two valves are effectively in parallel fluid conducting relationship to one another, said bypass valve being provided with a control member therefor which is operable for opening said bypass valve so as to bypass the shut-off valve.

5. In a shut-off valve for shutting off fluid flow in a fluid pressure line comprising a valve body having a valve-controlled inlet passage from said line and an outlet passage, a valve lever carrying a valve portion with the valve portion confronting said inlet passage to open and close said passage on movement of the valve lever, a blocker mounted in said body adjacent said lever for engageably locking it open to hold the valve locked open, first biasing means tending to move the valve lever in a path of travel from a position with the valve portion closing said passage to a spaced position therefrom in which the lever is engaged by the blocker to lock the valve open, diaphragm means forming one side of a chamber with the chamber side of said diaphragm means subjected to working pressure in said outlet passage, a spring connected to the diaphragm means opposing the action on the diaphragm of working pressure and acting with sufficient strength to overcome said working pressure and urge the diaphragm means to move when the working pressure drops below a predetermined value, means actuated by movement of the diaphragm means to unblock said valve lever when in said locked position by moving the blocker out of engagement with the lever, second biasing means stronger than said first biasing means connected to said valve lever, said second biasing means acting in a direction so as to overcome the first biasing means and close the valve lever when the valve lever is unlocked, said unblocking means moving said blocker upon movement of the diaphragm means in a direction urged by said spring whereby unblocking of the valve lever and the movement thereof to closed position by the second biasing means will be effectuated when the working pressure drops below said predetermined value.

6. A shut-off valve as described in claim 5, in which the second biasing means has a valve reset member which is movable to oppose the biasing force of said second biasing means on the lever to permit movement of the lever by said first biasing means to open said valve.

7. In an automatic shut-off valve for shutting off fluid flow in a fluid pressure line and having a valve casing and a valve-controlled inlet passage into said casing and an outlet passage from said casing, the combination of a valve lever having a valve portion confronting said passage and pivotally mounted in said casing for movement in a path between one position with the valve portion closing said passage and an open position in which the valve portion is spaced from the passage so as to open the latter, a blocker mounted in said casing adjacent the path of travel of the pivotally mounted valve lever, said blocker having a position of engagement with the valve lever for blocking it open to hold the valve locked open, diaphragm means arranged in said casing so as to form one side of a chamber containing said valve lever and with the chamber side of said diaphragm means subjected to working pressure in said outlet passage so as to move said diaphragm means toward and from a position of proximate relationship to said valve lever and in a manner tending to displace the diaphragm means from the lever with increasing working pressure, clamp means clamped to said diaphragm means for movement therewith, a spring connected to said clamp means opposing the action on the diaphragm means of the working pressure and providing a countervailing spring pressure which is effective in a direction forcing said clamp means to move the diaphragm means when the working pressure exerted on the latter drops below a predetermined value, valve-closing means engaged for movement with the valve lever in a direction tending to close the valve and effectively biasing said valve lever under preload against said blocker when the valve is blocked by the blocker, and means on the chamber side of said clamp means and moving therewith, in the direction in which the clamp means is forced by the spring, to pivot said blocker out of the path of said preloaded valve lever.

8. The combination according to claim 7 and further including means connected to, and shiftable to disengage said valve-closing means from, the valve lever to unload the latter from bias tending to close the valve.

9. In an automatic shut-off valve for shutting off fluid flow in a fluid pressure line and having a valve casing and a valve-controlled inlet passage from said line into said casing and an outlet passage from said casing comprising diaphragm means in said casing defining a chamber with which said outlet passage communicates to admit working pressure into the casing, a normally unpressurized chamber separated from the first-named chamber so as to be maintained substantially at atmospheric pressure, said diaphragm means separating said chambers so as to be subjected on one side to working pressure in said outlet passage and on the other side to atmospheric pressure for developing sufficient force, due to the inequality of the fluid pressures, to actuate said diaphragm means, a lockable valve lever in said casing having a valve portion confronting said inlet passage and pivotally mounted within said working pressure chamber for movement between a closed position with the valve portion closing said inlet passage and an open position with the valve portion spaced from and opening said inlet passage, locking means in said working pressure chamber engageable with the valve lever to lock same in its open position, valve closing means urging said lever in a direction toward its closed position so as to develop preloading bias on the valve lever when the latter is in the open, locked position aforesaid, and means to trip said locking means when the lever is in its aforesaid open, locked position so as to release the valve lever for closing movement under the urging of its preloaded closing means and comprising an actuator operatively connected between the diaphragm means and the locking means, a spring in said second atmospheric chamber and adjusted so that alone it creates a force less than the force due to said inequality of fluid pressures, said spring acting in a direction augmented by pressure build-up in said normally unpressurized chamber and together therewith overcoming said working pressure to trip said lever and close the valve in event of valve diaphragm leakage causing the relative pressure in the normally unpressurized chamber to rise to a point reducing said inequality of pressures to within a predetermined value.

10. The combination according to claim 9 and further including a conduit connected to said unpressurized chamber and communicating with the atmosphere, and a stricture in said conduit of a size enabling minor valve diaphragm leakage to dissipate therethrough without appreciable pressure build-up but being sufficiently small to build up an appreciably increasing back pressure with increased rate of such leakage.

References Cited in the file of this patent

UNITED STATES PATENTS

| | | |
|---|---|---|
| 1,814,530 | Spence | July 14, 1931 |
| 2,266,533 | Brisbane | Dec. 16, 1941 |
| 2,312,880 | Coffee | Mar. 2, 1943 |
| 2,451,029 | Hughes | Oct. 12, 1948 |